US011113413B2

(12) United States Patent
Klucar, Jr. et al.

(10) Patent No.: US 11,113,413 B2
(45) Date of Patent: Sep. 7, 2021

(54) CALCULATING DIFFERENTIALLY PRIVATE QUERIES USING LOCAL SENSITIVITY ON TIME VARIANT DATABASES

(71) Applicant: Immuta, Inc., College Park, MD (US)

(72) Inventors: James Leonard Klucar, Jr., Catonsville, MD (US); Kyle Lilly, Alexandria, VA (US); Joseph Regensburger, Grove City, OH (US); Steven Touw, Rockville, MD (US)

(73) Assignee: IMMUTA, INC., College Park, MD (US)

( * ) Notice: Subject to any disclaimer, the term of this patent is extended or adjusted under 35 U.S.C. 154(b) by 238 days.

(21) Appl. No.: 16/112,035

(22) Filed: Aug. 24, 2018

(65) Prior Publication Data
US 2019/0065775 A1    Feb. 28, 2019

Related U.S. Application Data (60) Provisional application No. 62/550,060, filed on Aug. 25, 2017.

(51) Int. Cl.
*G06F 21/62* (2013.01)
*G06F 16/2455* (2019.01)

(52) U.S. Cl.
CPC ...... *G06F 21/6227* (2013.01); *G06F 16/2455* (2019.01); *G06F 16/24552* (2019.01); *G06F 16/24554* (2019.01); *G06F 21/6245* (2013.01)

(58) Field of Classification Search
CPC ............. G06F 21/6227; G06F 21/6245; G06F 16/24552; G06F 16/2455; G06F 16/24554
See application file for complete search history.

(56) References Cited

U.S. PATENT DOCUMENTS 7,698,250 B2    4/2010  Dwork et al.
8,619,984 B2   12/2013  McSherry et al.
(Continued)

OTHER PUBLICATIONS

Cynthia Dwork, "Differential Privacy: A Survey of Results", TAMC 2008, Lecture Notes in Computer Science 4978, pp. 1-19.
(Continued)

*Primary Examiner* — Ashokkumar B Patel
*Assistant Examiner* — William B Jones
(74) *Attorney, Agent, or Firm* — MH2 Technology Law Group, LLP (57) ABSTRACT

Systems, methods, and manufactures for enhancing the determination of differential privacy query results. Implementations may include a database; a result cache; a processor; and a media storing instructions that, when executed by the processor, cause the system to perform operations that include obtaining a query of the database; determining that a specificity of the query exceeds a specificity threshold; determining that the result cache lacks any query results of previous queries that are substantially equivalent to the query; partitioning the database into a plurality of groups; determining a query result by executing the query on the plurality of groups; determining a sensitivity of the query and a nominal measurement of the query; determining a noisy result by adding noise to the query result based on the sensitivity and the nominal measurement; storing the noisy result in the result cache; and providing the noisy result in response to the query.

18 Claims, 9 Drawing Sheets

(56) References Cited

U.S. PATENT DOCUMENTS

| | | | |
|---|---|---|---|
| 8,627,488 | B2 | 1/2014 | Cormode et al. |
| 9,600,340 | B1* | 3/2017 | Mundar ................ G06F 9/5038 |
| 9,672,364 | B2 | 6/2017 | Zhang et al. |
| 2010/0070448 | A1* | 3/2010 | Omoigui ........... H01L 27/14647 |
| | | | 706/47 |
| 2011/0238611 | A1 | 9/2011 | McSherry et al. |
| 2011/0282865 | A1 | 11/2011 | Talwar et al. |
| 2012/0143922 | A1 | 6/2012 | Rane et al. |
| 2016/0335455 | A1* | 11/2016 | Mohan ................ G06F 21/6254 |
| 2017/0126694 | A1 | 5/2017 | Nerurkar et al. |
| 2017/0286526 | A1* | 10/2017 | Bar-Or ..................... G06F 8/60 |

OTHER PUBLICATIONS

Changchang Liu et al., "Dependence Makes You Vulnerable: Differential Privacy Under Dependent Tuples", In Proceedings 2016 Network and Distributed System Security Symposium, pp. 1-15.

Koobbi Nissim et al., "Smooth Sensitivity and Sampling in Private Data Analysis", In Proceedings of the Thirty-Ninth Annual ACM Symposium on Theory of Computing, May 17, 2011, pp. 1-34.

* cited by examiner

Image: KS metric with relative changes in sensitivity (dp) and median/sensitivty (dx)

FIG. 7

CALCULATING DIFFERENTIALLY PRIVATE QUERIES USING LOCAL SENSITIVITY ON TIME VARIANT DATABASES

CROSS REFERENCE TO RELATED APPLICATION

This application claims priority to U.S. Provisional Patent Application No. 62/550,060 which was filed on Aug. 25, 2017, the entire contents of which are incorporated herein by reference.

BACKGROUND

Data virtualization techniques can be used to create coherent representations of disparate data within the data environments of organizations. The data environments can include multiple data sources that use different technologies, and which may be updated in an asynchronous manner. Data virtualization techniques enable an organization to fuse multiple data sources together into a single collection that provides data analysts with a unified portal for accessing the organization's data. By executing queries on the data fused in a virtualized database, the data analysts can gain deep insights into emergent trends, correlations, and patterns that may influence the organization's performance.

The insights obtained by data analysts can be intrusive when applied to the personal information. For example, by applying data analytics to a virtualized database that combines information of various commercial data sources (e.g., retail, advertising, and credit information), a data analyst can determine the activities, preferences, and habits of particular individuals. This potential creates tensions with the personal privacy. To avoid privacy intrusion and to comply with privacy regulations, data analysts can use differential privacy (DP) techniques to balance the accuracy of data analytics with personal privacy. More specifically, differential privacy enables data analysts to build and distribute statistical and predictive models that preserve privacy, while maintaining the accuracy. Expressions (1) and (2) represent a relationship for providing differential privacy:

$$\frac{P(A(D) = X)}{P(A(D'_i) = X)} \le e^{\epsilon} \quad (1)$$

$$D = \{d_i, i = 1, \ldots, N\} D'_i = D - \{d_i\} \quad (2)$$

In expressions (1) and (2) above, A is an algorithm that can be considered differentially private, up to a level $\epsilon$, when operating on a database (D), if the image of A on D obeys the above relationship. D is a collection of N entries, D' is identical to D with the exception of the removal of one entry ($d_i$), X is the image of A on D and D', and $\epsilon$ is a positive constant. This formulation bounds the amount of new information added by an individual by $e^{\epsilon}$. As $\epsilon$ becomes small, the information added by a new individual has less impact on the measurement, A(D). The relationship above must hold for all D'i. To ensure that this relationship, some noise can be added to a nominal measurement, where the nominal measurement is the measurement with no noise added. The amount of such noise can be scaled so as to obscure the contribution of each individual. Doing so involves scaling the noise to account for the impact of outliers on a measurement, A(D). This impact is calculated in terms of the measurement sensitivity, s, defined in expression (3) below:

$$s = \max_i |A(D) - A(D'_i)| \quad (3)$$

Once calculated, the noise can be added to the nominal measurement by drawing a single sample from a Laplacian distribution, an exponential distribution, or other stochastic distribution, centered at the nominal measurement. For illustrative purposes, consider the noise being drawn from a Laplacian distribution centered at the nominal measurement, x0. The shape of such distribution depends on the sensitivity, s, and a positive constant, $\epsilon$, as represented by the following expression.

$$f(x \mid x_0, s, \epsilon) = \frac{\epsilon}{2s} \exp\left(-\epsilon \frac{|x - x_0|}{s}\right) \quad (4)$$

In expression (4) above, as $\epsilon$ approaches infinity, the above distribution approaches an infinite impulse function, returning the nominal measurements with 100% probability. As $\epsilon$ decreases the noise added to the solution becomes large, which obscures the contributions from any one individual, which protects the individual's privacy.

While the use of a differential privacy framework can protect individual privacy, practical implementations that use such frameworks are limited by numerous technical challenges. For example, implementations of conventional differential privacy techniques in a computing system would be inefficient and require vast amounts of computing processing power to provide useful results. Moreover, such conventional implementations would be insecure and would not protect the privacy of the individual's information. Accordingly, it would desirable to provide methods and systems for differential privacy that address these and other technical challenges.

BRIEF SUMMARY

Disclosed are systems, methods, and manufactures for enhancing the determination of differential privacy query results. In various implementations, the system may include a database; a result cache; one or more processors; and a computer-readable data storage device storing program instructions that, when executed by the one or more processors, cause the system to perform operations as described herein. In various implementations, the operations may include obtaining a first query of the database; determining that a specificity of the first query exceeds a specificity threshold; determining that the result cache lacks any query results of previous queries that are substantially equivalent to the first query; partitioning the database into a plurality of groups; determining a query result by executing the first query on the plurality of groups; determining a sensitivity of the query and a nominal measurement of the query; determining a noisy result by adding noise to the query result based on the sensitivity of the query and the nominal measurement of the query; storing the noisy result in the result cache; and providing the noisy result in response to the first query.

Some implementations may include a computing system that comprises: a virtualized database (which itself includes a collection of databases, and an aggregation framework); a result cache; a processor; and a computer-readable data storage device storing program instructions that, when executed by the processor, cause the computing system to perform operations as described herein. In various implementations, the operations may include: obtaining a first query of the virtualized database; determining relevance criteria of the query; determining that no cached query result stored in the result cache is relevant to the first query; determining a differentially private query result by executing the first query on the virtualized database; refreshing the result cache using the differentially private query result; and providing the differentially private query result in response to the query.

In various implementations, the operation may further include determining whether a query is executed over a dataset with sufficient size to be divided into statistically equivalent groups. In some implementations, determining if a query can be divided into statistically equivalent groups is measured using a statistical test of equivalence such as counting, ANOVA, or other tests for equivalence. In some implementations, determining that the result cache lacks any query results of previous queries that are substantially equivalent to the first query includes determining whether one or more of the query results of previous queries are stale. In other implementations, determining whether one or more of the query results of previous queries are stale includes determining that a predetermined period has passed since determination of the one or more query results of the previous queries. In yet other implementations, storing the result in the result cache includes: generating a hash key of the first query using the sensitivity of the query and the nominal measurement of the query; and storing the randomized response in the result cache under the hash key. In yet other implementations, adding noise to the query result includes generating randomized result using a Sample and Aggregate (SA) framework. In still other implementations, the database comprises a virtualized database including a single data structure configured to present a plurality of data sources as a single data source. In still other implementations, the virtualized database comprises personal information of individuals.

In some implementations, the operations further include determining whether a specificity of the first query exceeds a predetermined specificity threshold. Also in some implementations, determining the differentially private query result includes: partitioning the virtualized database into a plurality of groups; and determining a query result by executing the first query on the plurality of groups. In some implementations, determining the differentially private query result includes: determining a result of the first query from the virtualized database; determining a sensitivity of the query and nominal measurement of the query; and adding noise to the result of the first query based on the sensitivity of the query and the nominal measurement.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure.

DETAILED DESCRIPTION

The present disclosure is directed to methods and systems that protect the privacy of information. More particularly, the present disclosure is directed to methods and systems for executing numerically stable, differentially private queries efficiently upon a database, such as a virtualized, time-variant, queryable database.

There are numerous technical challenges to implementing a conventional differential privacy framework within a virtualized environment. First, a conventional differential privacy framework scales sensitivity to the extreme outliers in the database. By scaling sensitivity to include the response of outliers, the differential privacy framework offers a strong privacy protection, while minimizing the amount of noise added to the measurement. However, this protection introduces additional technical challenges. In expressions (1) and (2) above, $A(D')$ is measured for all $D'$. However, when A is computationally costly and D has a large cardinality, calculating sensitivity becomes non-analytic and computationally impractical $A(D'i)$. These computational challenges are compounded in time-variant and sample-variant databases. Specifically, as new data is injected into the system, a differential privacy framework may respond to the new data and scale the additional noise in the event that new observations have outliers. The other option is to add noise proportional to the maximum sensitivity that could be introduced by any possible data. However, such information may be unknown or may be so large can render the system unusable.

Local Sensitivity (LS) is a method which modifies how sensitivity is determined, such that sensitivity can be calculated more efficiently and the impact of outliers is reduced. LS may begin by defining a Sample and Aggregate (SA) framework that partitions a database (D) into k distinct groups $\{D_k\}$ and measures $A(D_k)=X_k$ each group. The nominal value of $A(D)=X$ can be replaced by the median of $\{X_k\}$, defined as the locally smoothed approximation of $A(D)$.

In accordance with aspects of the present disclosure, the use of the SA framework accomplishes two things. First, it defines an equivalent measure of $A(D)$ which can be efficiently calculated in a distributed computing environment.

Second, the reported measurement can be considered to be a median, calculated over a database of partitions. The sensitivity of A(D) can be estimated using the defined sensitivity of the median, as represented by the following expression:

$$LS(A(D)) = \max(A(D_{k/2}) - A(D_{k/2-1}), A(D_{k/2+1}) - A(D_{k/2})) \quad (5)$$

Expression (5) above determines a difference nominal median of A(Dk) and its nearest neighbors to calculate LS. This means the sensitivity of any function A(D) which can be approximated using subsamples on D can be calculated analytically, even for non-analytic algorithms, without needing to measure all D'I.

Another challenge of implementing a conventional differential privacy framework within a virtualized environment is the dilution of privacy. Privacy dilution can occur when a malefactor submits multiple, identical differential privacy queries against a data source. The malefactor can use the ensemble of query results to estimate the amount of noise added to each result and the true nominal value.

Differential privacy implementations can account for dilution using a privacy budget. In some implementations, a privacy budget may limit a number of queries that can be made against a database. For example, a differential privacy system may store a cumulative number of equivalent queries, while simultaneously accounting for time variant data in the database. In other implementations, the differential privacy system may enforce a privacy budget. That it, the system may track the number of queries issued against a database, and increase the amount of noise added to each result with each new query so as to completely obfuscates measurements by the addition of noise over time.

Accounting for the privacy dilution can introduce another technical challenge of efficiently storing and searching cached results. Conventional solutions to privacy dilution store a cache of results and can return a particular result from the cache result if two queries are observed to be equivalent. However, such solutions may involve a system storing a large cache of results and executing statistical tests for equivalence on the results. Such a process presents significant technical issues with searching, computing, and securing information. From the accounting perspective, the solution would involve the system searching all cached results for equivalence. From the computational perspective, the solution would involve the system executing statistical tests on all stored results. And from a security perspective, the solution would involve the system storing raw results cache, which risks potential privacy leakage.

Queries with too great specificity and executed over datasets which lack of sufficient statistical sample size is another technical challenge in executing differential privacy queries in a virtualized environment. As queries become too specific, sample sizes may become too small, resulting in a risk that sensitivities become very large. Under small sample conditions, noise added to the nominal measurement risks becoming larger than the observed variance in the measurement. As a result, the reported measurements lose their informational value, and may provide no informational content useful in developing numerical models. In the SA framework, variance among the individual A(Dk) results can be determined and, if significant, a system can flag the query as too specific and not return any information.

Additionally, variations in database dialects can present a yet another technical challenge to executing differential privacy queries in a virtualized environment. For example, database technologies may each have different syntaxes particularly in how sampling of source data is performed. Since randomized sampling is used to provide a SA method for differential privacy, implementations disclosed herein address the varying host dialects so as to permit such randomized sampling.

Methods and systems consistent with the present disclosure overcome the above-described technical challenges by implementing differential privacy so as to provide computational efficiency, data security, and dialectical flexibility. In accordance with aspects of the present disclosure, a parameter set (ε, r, k) can be used to partition a data source, such as a virtualized data source, and estimate local aggregate statistics and sensitivity. The privacy parameter (ε), and the relevance criteria (r) for a virtualized data source can be selected by a user for a given data source or by a change detection threshold of the virtualized data source, while the number of partitions (k) can be selected using heuristics. The parameter set (ε, r, k) define a randomized k partitions of the source data, and a privacy parameter, ε. The measuring the aggregate statistic on randomized partitions and adding noise consistent with the privacy parameter will generate an estimate of the aggregate with noise added. The noise added to the nominal result is drawn from a distribution of sufficient variance to satisfy the differential privacy definition shown in Equation 1. Such noisy estimate which can be stored and returned for queries determined to be equivalent or substantially equivalent to a previous query based on a set of relevancy criteria.

Implementations consistent with the present disclosure improve on the conventional technology by implementing a framework that approximates aggregate statistics and their associated sensitivity, while defining the relevancy criteria of a measurement. The framework is parallelizable and enables efficient estimates of sensitivity for a myriad of aggregate statistics, while simultaneously guarding against privacy dilution. By doing so, implementations consistent with those disclosed herein address the above-detailed technical challenges of executing differential privacy queries by efficiently scaling measuring sensitivity noise to the presence of extreme outliers and varying aggregate functions, avoiding privacy dilution resulting from multiple queries, efficiently and securely storing and searching a cache of differential privacy results, avoiding insufficient statistics and overly specific queries, and negotiating a plethora of database dialects over which differential privacy queries can be executed.

Figure 1A:
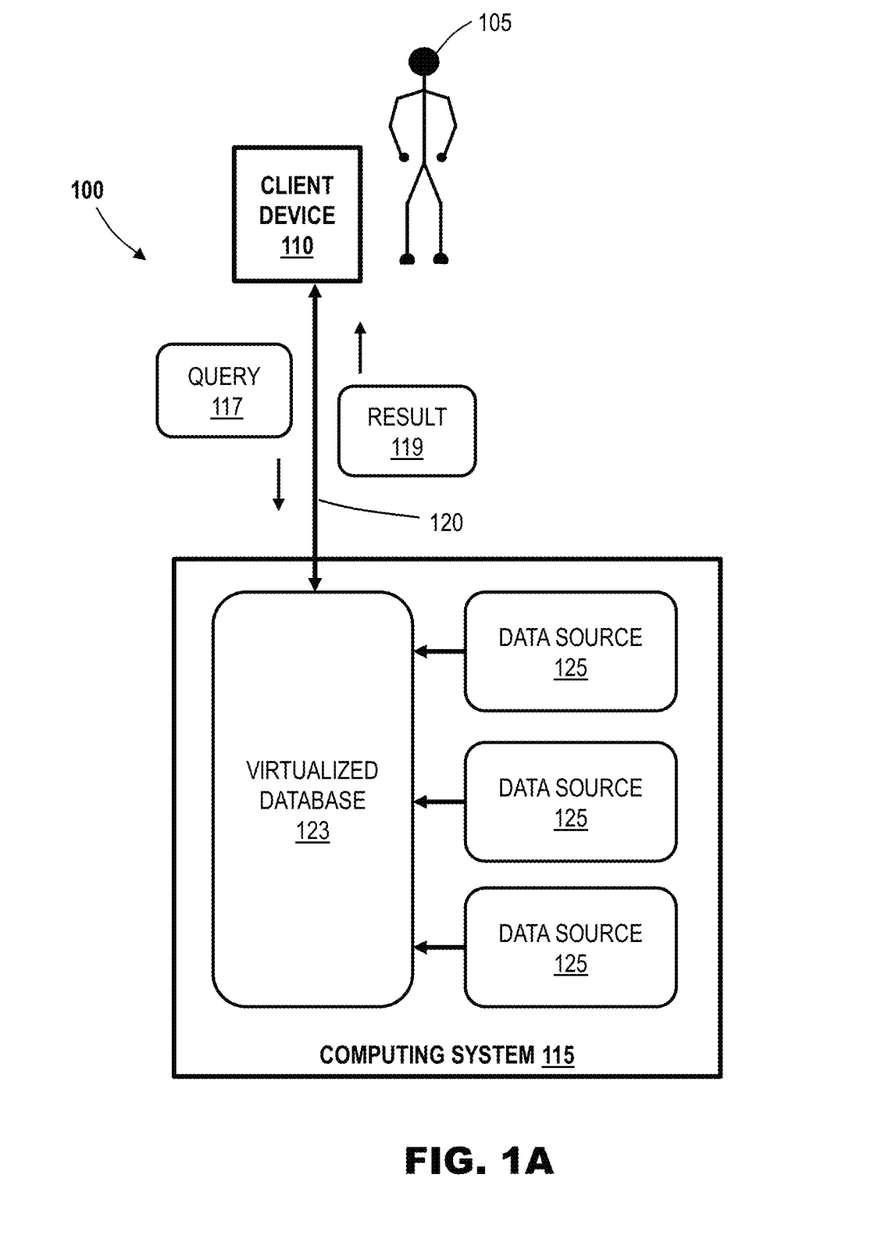
FIG. 1A shows a block diagram illustrating an example of an environment for implementing systems and processes, in accordance with aspects of the present disclosure.

FIG. 1A illustrates a block diagram of an example of an environment 100 for implementing systems and methods in accordance with aspects of the present disclosure. The environment 100 can include a user 105, a client device 110, and a computing system 115. The user 105 (e.g., a data analyst or a data scientist) can be an individual that provides a query 117 to computing system 115 to obtain a result 119. For example, the user 105 can be a data analyst or data scientist.

The client device 110 can be an input/output device or computing system that is communicatively connected (directly or indirectly) to the computing system 115 via one or more communication channels 120. In implementations, the client device 110 can be a terminal of the computing system 115 or a personal computing device that provides a user interface. For example, the client device 110 may provide the user 105 a graphic user interface through which the user 105 can provide the query 117 to the computing system 115. The communication channel 120 can comprise a wired or wireless data link and/or communication networks, such as a data bus, a local area network, a wide area network, or the Internet.

The computing system 115 includes hardware and software that perform processes, services, and functions described herein. The computing system 115 can include a virtualized database 123 including information from one or more data sources 125. The data sources 125 can be any type of information repository that is queryable. In some implementations, the data sources 125 are queryable databases that are columnated. The data sources 125 can also include data structures, such as PANDAS DATAFRAME, and R DATAFRAMES. The data sources can also or columnated data sources, such as EXCEL worksheets or ACCESS databases provided by MICROSOFT CORPORATION of Redmond, Wash. For example, the data sources 125 can be different collections of information maintained by a healthcare provider that contain patient information from patients, caregivers and insurers. While the data sources 125 are illustrated as being within the computing system 115, it is understood that some or all of the data sources 125 can stored remotely and maintained by one or more entities different from an entity that provides, operates, or maintains the computing system 115.

The virtualized database 123 can be a data structure that serves as a container allowing the user 105 to transparently view and query the data sources 125 as if they were a single, unified set of data. By doing so, the user 105 can access information of the data sources 125 as a single database, without copying, duplicating, or combining the information of the data sources 125. The virtualized database 123 can be queryable data sources, such as POSTGRESQL, AMAZON REDSHIFT, APACHE HIVE, and SQL SERVER.

While the environment 100 shown in FIG. 1A illustrates the client device 110 and the computing system 115 as a single system used by a single user 105, it is understood that the environment 100 can comprise a number of client device 110 and computing system 115 used by a number of users 105. For example, the environment 100 can be a distributed system (e.g., a cloud computing environment) that serves a number of users 105 at different locations via, for example, by a wide area network (e.g., the Internet).

Figure 1B:
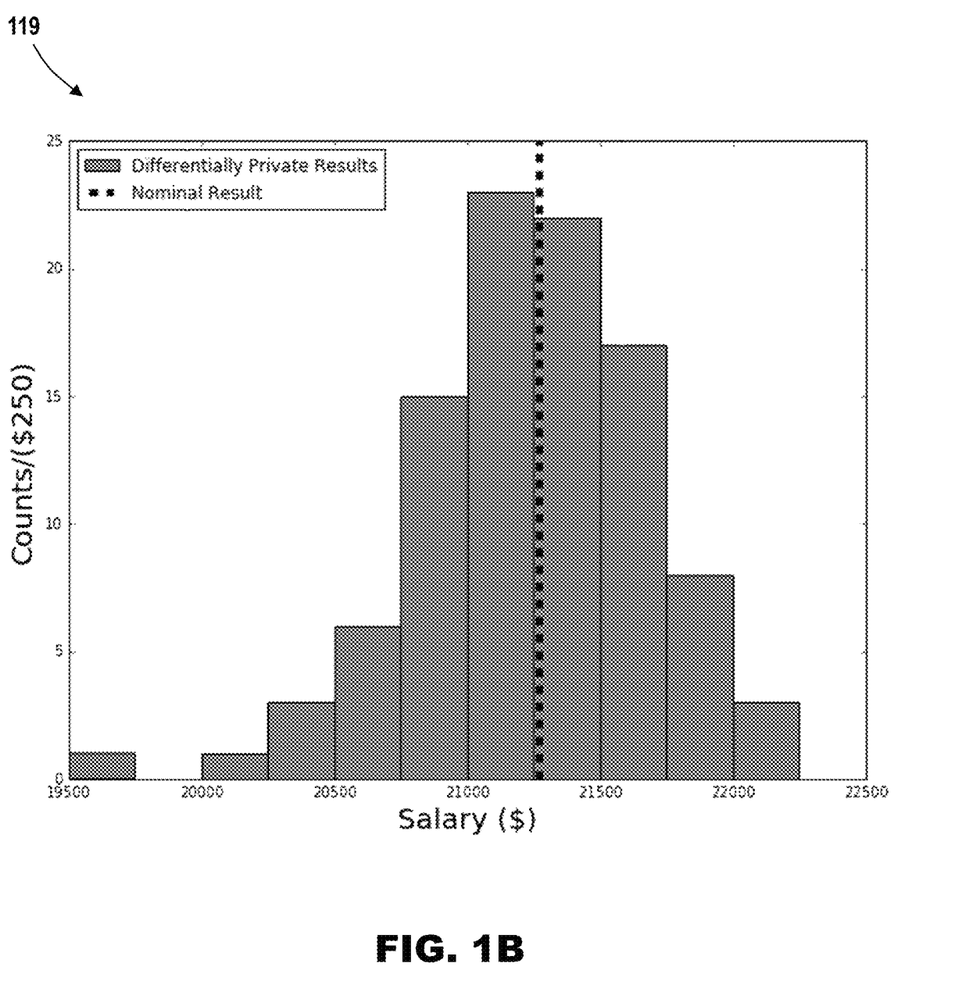
FIG. 1B shows a chart illustrating an example of a differential privacy query result, in accordance with aspects of the present disclosure.

FIG. 1B shows a chart illustrating an example of a differential privacy query result 119, in accordance with aspects of the present disclosure. In the illustrated, non-limiting example, the result 119 can be provided by a computing system (e.g., computing system 115) in response to a query (e.g., query 117) received from a user (e.g., user 105) via a computing device (e.g., client device 110). The query 119 could be directed a database (e.g., data source 125) storing salary information protected by differential privacy in accordance with aspects of the present disclosure. The query 119 on such database could include the following parameters: SELECT AVG (salary), FROM payroll_data, WHERE department='CUSTOM SERVICE'. The result 119 for the example query 117 may take the form of a distribution, as shown in FIG. 1B. More specifically, the result 119 may indicate average salary of $21,752.22, as opposed to the true nominal average salary of $21,267.51. In situ implementations can also automatically scale the added noise to obscure outliers within the database, as described herein below.

Figure 2:
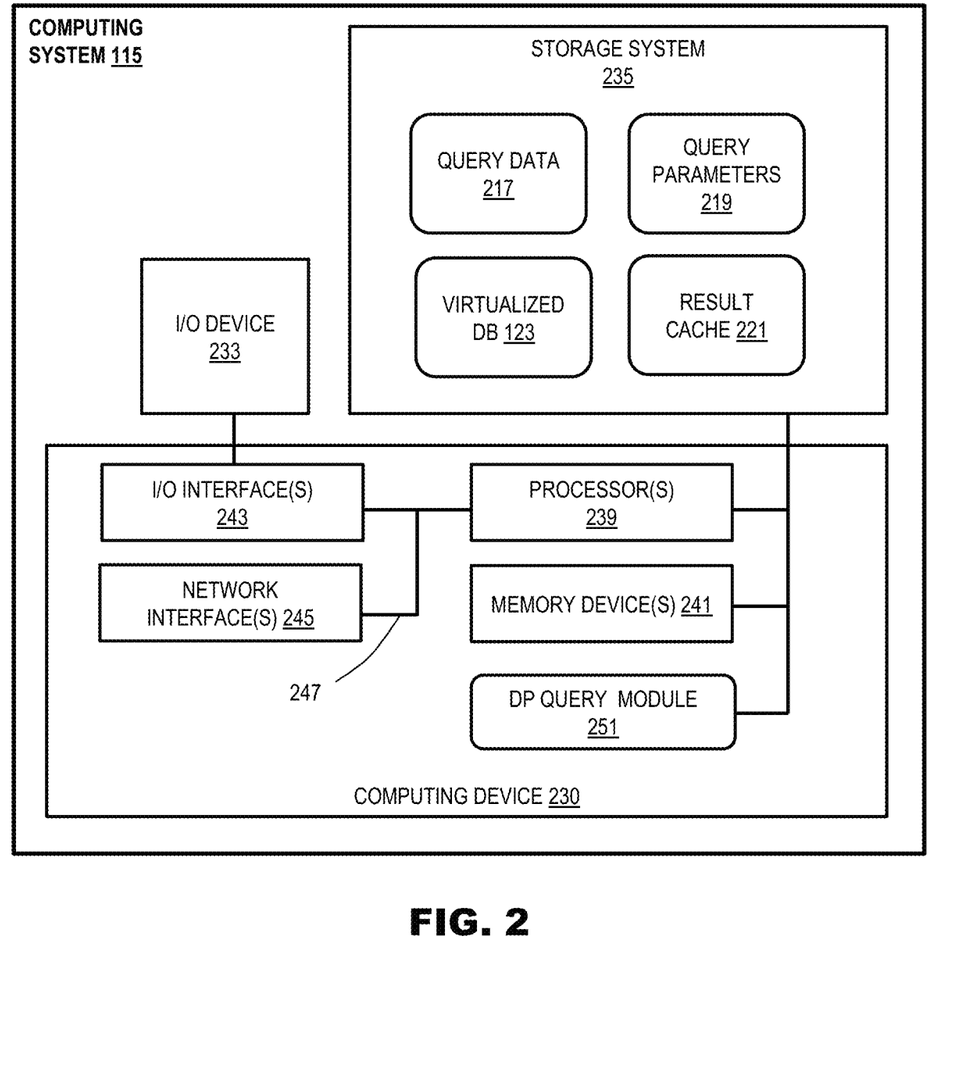
FIG. 2 shows a system block diagram illustrating an example of a computing system, in accordance with aspects of the present disclosure.

FIG. 2 shows a system block diagram illustrating an example of the computing system 115, in accordance with aspects of the present disclosure. The computing system 115 can include a computing device 230, an input/output (I/O) device 233, and a storage system 235. The I/O device 233 can include any device that enables an individual (e.g., an operator, an end user and/or consumer) to interact with the computing device 230 and/or any device that enables the computing device 230 to communicate with one or more other computing devices (e.g., client device 110) using any type of communications link (e.g., communication link 120). The I/O device 233 can include, for example, a touchscreen display, pointer device, keyboard, etc. In implementations, the I/O device can provide a user interface for the computing system 115 to another computing device (e.g., the client device 110).

The storage system 235 can comprise a computer-readable, non-volatile hardware storage device that stores information and program instructions. For example, the storage system 235 can be one or more flash memories and/or hard disk drives. In accordance with aspects of the present disclosure, the storage system 235 can store query data 217, query parameters 219, a result cache 221, and a virtualized database 123, which can the same or similar to that previously described.

In embodiments, the computing device 230 includes one or more processors 239 (e.g., a microprocessor, a microchip, or an application-specific integrated circuit), one or more memory devices 241 (e.g., random access memory (RAM) and read only memory (ROM)), one or more I/O interfaces 243, and one or more network interfaces 245. The memory device 241 can be a local memory (e.g., RAM and a cache memory) employed during execution of program instructions. Additionally, the computing device 230 includes at least one communication channel 247 (e.g., a data bus) by which it communicates with the I/O device 233 and the storage system 235. The processor 239 executes computer program instructions (e.g., an operating system and/or application programs), which can be stored in the memory device 241 and/or storage system 235. Moreover, the processor 239 can execute computer program instructions of differential privacy query module 251, which functions to process queries (e.g., query 117) and respond by producing differentially private query results (e.g., result 119), as detailed below.

It is noted that the computing device 230 is only representative of various possible equivalent-computing devices that can perform the processes described herein. To this extent, in embodiments, the functionality provided by the computing device 230 can be any combination of general and/or specific purpose hardware and/or computer program instructions. In each embodiment, the program instructions and hardware can be created using standard programming and engineering techniques, respectively.

The flow diagrams in FIGS. 3A-6 illustrate examples of the functionality and operation of possible implementations of systems, methods, and computer program products according to various implementations consistent with the present disclosure. Each block in the flow diagrams of FIGS. 3A-6 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 3A-6. For example, two blocks shown in succession can be executed substantially concurrently, or the blocks can sometimes be executed in the reverse order, depending upon the functionality involved. It will also be noted that each block of the flow diagrams and combinations of blocks can be implemented by special purpose hardware-based systems that perform the specified functions or acts, or combinations of special purpose hardware and computer instructions.

Figure 3A:
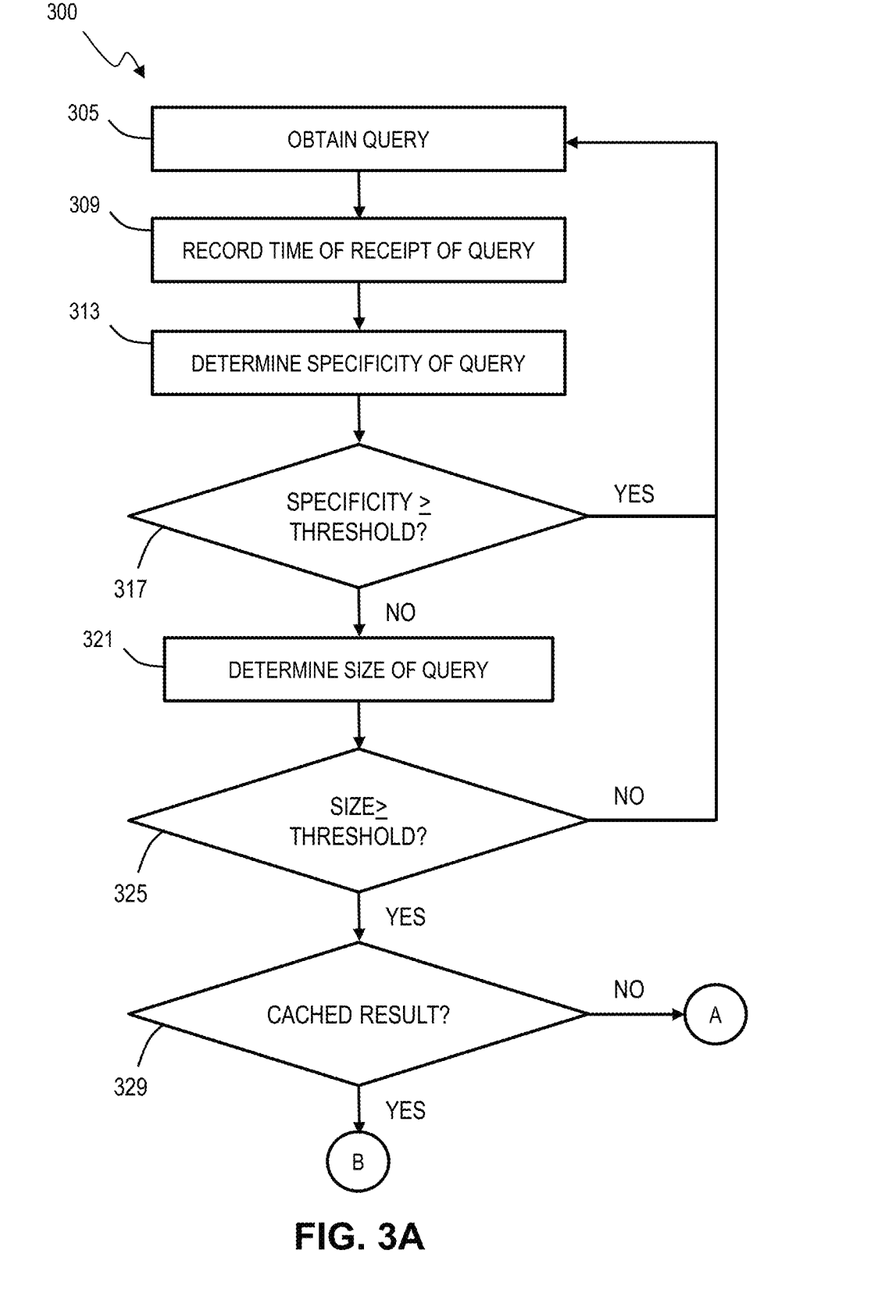
FIG. 3A shows a flow block diagram illustrating an example process for producing a differentially private query result, in accordance with aspects of the present disclosure.
Figure 3B:
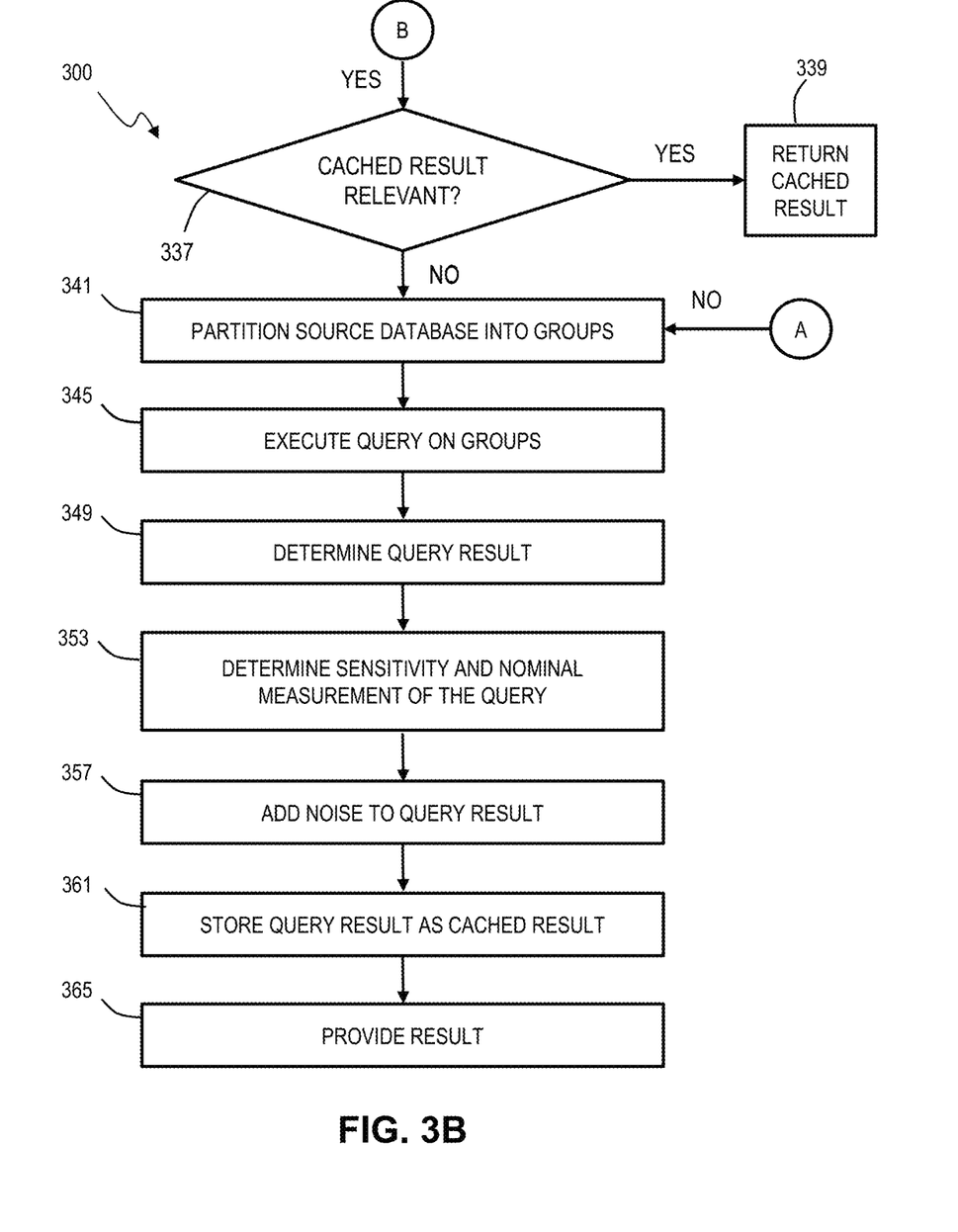
FIG. 3B shows a flow block diagram illustrating an example process for producing a differentially private query result, in accordance with aspects of the present disclosure.

FIGS. 3A and 3B show a flow block diagram illustrating an example of a process 300 for producing a differentially private query result, in accordance with aspects of the present disclosure. As illustrated in FIGS. 3A and 3B, the query result (e.g., result 119) may be dependent on a privacy parameter, an aggregated query (e.g., query 117), and a virtualized database (e.g., virtualized database 123). At 305, a system (e.g., computing system 115 executing differential privacy query module 251) receives a query against the virtualized database from a user (e.g., from user 105) via a user device (e.g., client device 110 and communication link 120). The query can be an aggregated query, which is a function that groups source data (e.g., source data 125) by a common set of sensitive, private categorical attributes and measures a reductive mathematical operation. Examples of sensitive, private attributes that can be grouped are personal data, such as zip code, month of birth, gender, occupation, etc. Examples of this aggregate functions can include mean, variance, interquartile range, minimum, maximum, ordinary least squares, etc. The aggregate functions may be constrained such that they can be executed on the entire database or on partitions of the database, and return statistically similar results.

The process 300 overcomes the technical challenges of allotting a privacy budget to account for dilution, and efficiently storing and searching cached query results, as previously described herein. In contrast to conventional implementations of differential privacy techniques (e.g., a canonical system) that may track a history of queries, identify if those queries are equivalent, and track user history, some implementations of the process 300 cache of noisy results for storing and search so as to maintain the differential privacy guarantees.

More specifically, at 309, the system can record a time the query was received at 305 as query data (e.g., query data 217). At 313, the system can determine and record a specificity of the query in the query data. For example, in some implementations, the specificity can be checked by partitioning the data into k partitions and such that each partition has at least one partition. This is an example of "The Coupon Collector's Problem," which places a stochastic lower limit on overall sample size of roughly k*log(k)+mk, or roughly 29 observations if k=10. In some other implementations, for example, the data can be randomly sorted and partitioned into a number (k) of distinct groups. Doing so places a deterministic specificity threshold of k groups. By limiting the specificity of the query, various implementations avoid adding unrealistic amounts of noise, as may occur in a conventional differential privacy implementations.

At 317, the process 300 determines whether the specificity determined at 317 exceeds a specificity threshold. If the specificity threshold is exceeded (i.e., 317 is "YES"), then the user can be informed that their query is too specific and asked to change the specificity (not shown), and the process 300 may iteratively return to 305 for submission of a revised query.

If the specificity determined at 313 does not exceed the specificity threshold (i.e., 317 is "NO"), then at 321 the system can determine a size of the query. In implementations, the size of the query is a number (e.g., a count) of observations or results that satisfy the query. At 325, the system determines whether the size determined at 321 meets or exceeds a required specificity threshold. For example, if the number of partitions is set to 10 and the record set consists of only 15 observations, leading a high probability of unpopulated bins, the query may be rejected because the number of query observations does not exceed the threshold value that is appropriate for the number of partitions, such as a threshold value that is three, four, five or six times the number of partitions, or more. If the size determined at 321 is less than the size threshold (i.e., 325 is "NO"), then the system can inform the user that the query fails to meet the size criteria (not shown), and the process 300 may iteratively return to 305 for submission of a revised query.

If at 325 the system determines that the size determined at 321 is greater than or equal to the size threshold (i.e., 325 is "YES"), then at 329, it determines whether a cached result exists for the query received at 305. For example, the system can reference a result cache (e.g., result cache 221) and determine whether a previous query matches (e.g., exactly) or is substantially equivalent to the query received at 305 and has been previously stored in the result cache. At 329, if the system determines that the result cache does not include a substantially matching cached result (i.e., 329 is "NO"), then the process 300 can proceed to 341 of FIG. 3B as indicated by linking reference "A." On the other hand, if 329 is "YES" and there is a substantially matching cached result, then the process 300 can proceed to 337 of FIG. 3B, as indicated by linking reference "B."

At 337, the system can determine whether any of the cached query results (e.g., in result cache 221) are relevant to the query received at 305. The relevance can be determined based on whether the database has been changed since the last (e.g., a most recent), similar query was determined, processed, or resolved, or whether the cached result is stale (i.e., old or not fresh). For example, the cached may be stale when the system determines that a predetermined time period has passed between the time the cached query results were determined and the time the query was obtained at 305, 309. Determining whether the database is sufficiently changed or the cached result old enough to be irrelevant can be done using two estimates. First, the system can use a predefined freshness threshold. A notional range of values for this freshness threshold in various implementations may be, for example, five minutes, ten minutes, 30 minutes, one hour, six hours, 12 hours, one day, two weeks, or one month, depending on the frequency with which new data is ingested into the system. If the time since the last query is greater than the freshness parameter, the query from 305 can be executed anew on the database 123. Second, the system can define a hash of the system (e.g., of the database 123) or look at historical logs and measure or analyze these to determine if there are sufficient changes in the database to make any cached result irrelevant. If the database has not changed within the predefined defined time frame (i.e., is relevant such that 337 is "YES), then at 339, the system can return the cached result determined or identified at 329.

If the database has changed within the predefined defined time frame (i.e., 337 is "NO") or there is no substantially matching cached result via linking reference "A" from 329, then at 341, the system partitions the virtualized database into discrete groups. The partitioning can be executed using one or more sampling methods, such as purely random sampling, stratified sampling, or quota based sampling. In implementations, the sampling may be a randomized uniform sample such that each of the partitions partition is roughly of equal size and is representative of the source database (e.g., data sources 125) within an acceptable statistical accuracy (e.g., one or two standard deviations). The system can partition the virtualized database using a distributed query engine, such as POSTGRESQL FOREIGN DATA WRAPPERS (FDW), APACHE PRESTO, or similar technologies known to those of ordinary skill in the art of data analytics. Such distributed query engines may allow for one or more differential privacy queries to be performed across data stored in multiple physical databases and technologies, and may allow such queries to be performed without maintaining copies or defined caches of data from the multiple physical databases.

At 345, the system executes the query received at 305 on the groups determined by the partitioning at 341. Partitioning the data and executing the query over the partitions provides more flexibility to executing differential privacy over a large number of aggregate functions, when compared with a conventional differential implementation. Under conventional differential privacy implementations, sensitivity is driven entirely by the aggregate function. In other words, customized sensitivity functions are defined for each aggregate. Using partitioning and the SA method simply estimates the inherent variance of an arbitrary aggregate on the data and uses this to estimate the aggregate's sensitivity. As a result an arbitrary number of aggregate functions can be introduced within the SA framework. In implementations, the system can execute an aggregate query on each of the partitions. This can either be executed on a single computer or in a distributed computing paradigm, such as MAPREDUCE, APACHE SPARK, etc. For example, a computationally efficient implementation may be executed using distributed processing.

At 349, the system determines a query result (e.g., result 119) to the query executed at 345. The result may include a set of aggregate functions, measured on each partition. At 353, the system determines a sensitivity and nominal measurement of the query executed at 345 on the entire partitioned database. At 357, noise can be added or assigned to the query result 119, based on the measurement determined at 353, for example, using a noise generation algorithm. The set of measurements determined at 353 can be combined with a privacy parameter as an input to the noise generation algorithm to create a noisy result. Once the noisy result is generated, this value and any metadata of the query (e.g., timestamps, geospatial data, Application Program Interface (API) keys, etc.), can be stored as a cached result at 361 (e.g., in the result cache 221). At 365, the same result 119 that was determined at 357 and cached can be returned to the user in response to the query 117 obtained at 305.

As detailed above, the processes 300 overcome the inefficiencies of conventional differential privacy implementations. Merely implementing conventional differential privacy techniques, a computing system would use analytic expressions for sensitivity or exhaustively estimate the sensitivity of arbitrary aggregates, which is computationally costly. In contrast, implementations consistent with the present disclosure (e.g., as shown in FIG. 3B) provide a SA differential privacy process 300 that is computationally efficient and extensible.

Figure 4:
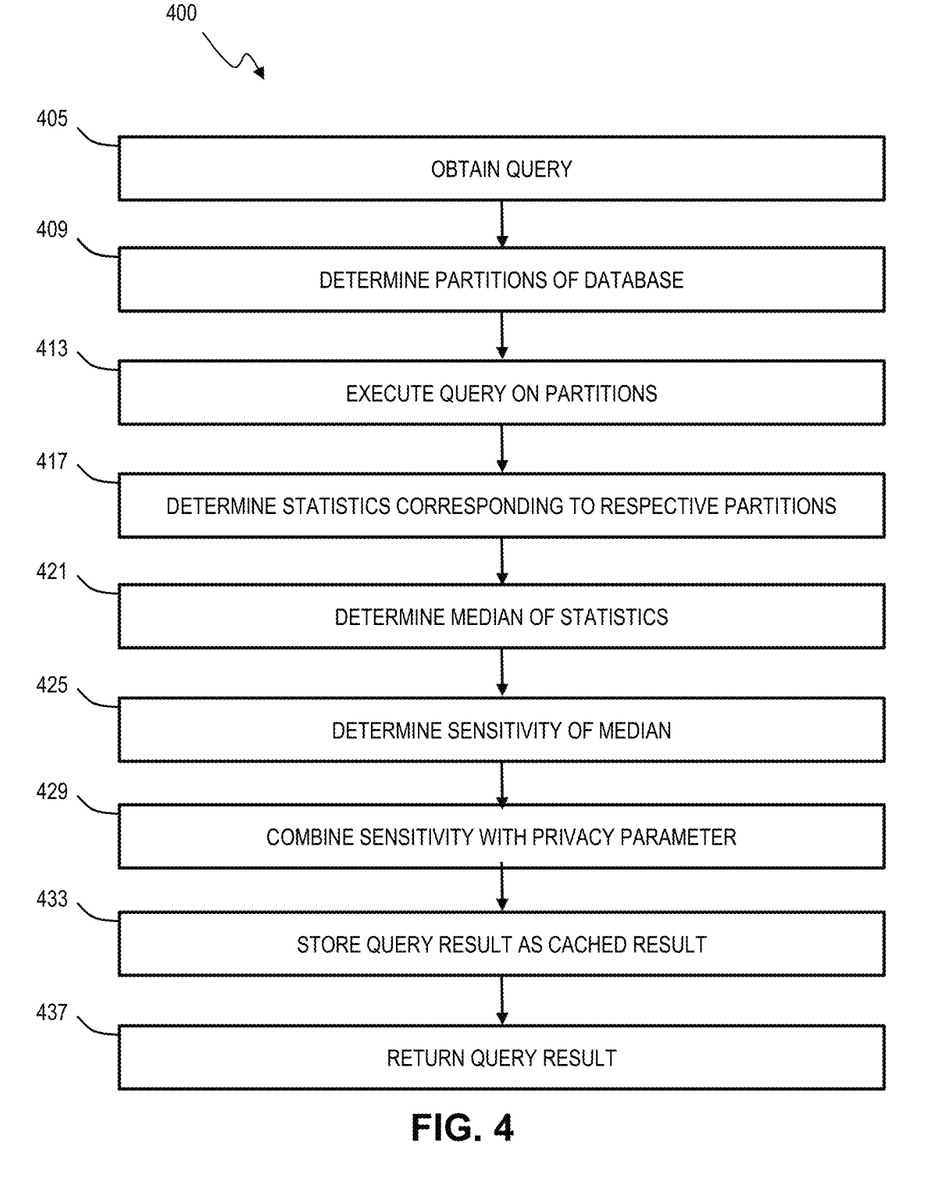
FIG. 4 shows a flow block diagram illustrating an example process for determining a differential privacy query result, in accordance with aspects of the present disclosure.

FIG. 4 shows a process flow diagram illustrating an example of a process 400 for calculating differential privacy query results, in accordance with some implementations of the present disclosure. The example shown in FIG. 4 illustrates partitioning, aggregation, and noise generation for a differential privacy query result (e.g., result 119) using a SA framework to calculate LS based on a query (e.g., query 117) and a privacy parameter.

At 405, a system (e.g., computing system 115 executing differential privacy query module 251) obtains the query (e.g., FIG. 3, 305). For the purposes of the present example, it is assumed that the query has either never been executed or the cache of query results 221 lacks any cached query result (e.g., FIG. 3A, 329, "NO"), or lacks any relevant query result (e.g., FIG. 3B, 337, "NO"). At 409, the system partitions the database (e.g., database 123) into a set of distinct groups based on either user input or predefined heuristics (e.g., FIG. 3B, 341). As stated earlier, in implementations, a constraint of the partitioning is that a result of the query on the partitions may be statistically equivalent to the query on the partitioned database. The equivalence constraint can be assessed using heuristics, such as $\chi^2$ statistics, Kolmogorov Smirnov (KS) metrics, or earth mover distances (EMD) to measure the closeness of the partitions to the source system, or the process shown in FIG. 4. These heuristics can also be used to determine a maximum number of partitions which can be defined. Otherwise, a user can predefine the number of partitions and the system can alert the user if the partitions are too fine to accurately mirror the source database.

At 413, the system executes the query obtained at 405 on the partitions determined at 409. After executing the query at 413, the system determines or produces a set of aggregate statistics corresponding respectively to the partitions determined at 409. At 421, the system can calculate a median of the set of aggregate statistics determined at 417. At 425, the system can calculate a sensitivity of the median 270 determined at 421. The sensitivity of the median can be determined using expression (5), which was previously described and is reproduced below:

$$LS(A(D)) = \max(A(D_{k/2}) - A(D_{k/2-1}), A(D_{k/2+1}) - A(D_{k/2})) \quad (5)$$

wherein:

$A(D_{k/2})$ is the nominal median, and $A(D_{k/2-1})$ and $A(D_{k/2+1})$ are its nearest neighbors.

In implementations, determining the sensitivity can involve determining a set of values of the partition to be sorted prior to calculating sensitivity. For example, the values can be sorted to identify the median value. At 429, the system can combine the median determined at 421 and/or the sensitivity determined at 425, with a predefined privacy parameter 215. The differentially private query result can be determined by sampling from a Laplacian distribution centered at A(Dk) and with a scale parameter equal to $LS(A(D))/\varepsilon$. In various implementations, the system distinguishes between the nominal query result and the differentially private query result. The nominal result is the result of the query, without additional noise; whereas the DP query result is the nominal result with noise added by both randomized partitioning and Laplace noising. At 433, the system can store the differential privacy result in the result cache (e.g., result cache 221) along with the source query and query time. At 437, the system can return the result 119 to the user.

Figure 5:
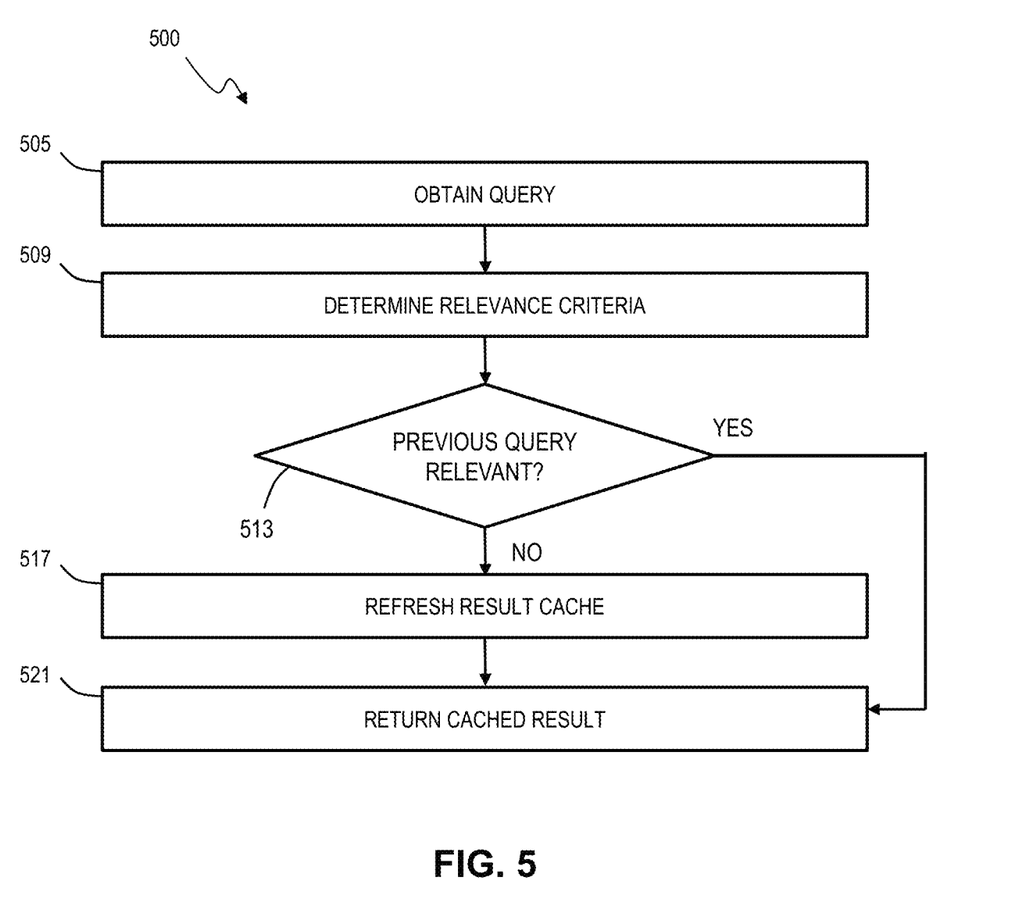
FIG. 5 shows a flow block diagram illustrating an example process for updating a cached differential privacy query result, in accordance with aspects of the present disclosure.

FIG. 5 shows a flow block diagram illustrating an example of a process 500 for updating a cached differential privacy query result, in accordance with aspects of the present disclosure. The process 500 can be used to determine whether a query (e.g., query 117) is both sufficiently similar (e.g., substantially equivalent) to a past query and executed within a predetermined time window (e.g., not stale). This check enables a system (e.g., computing system 115) to preserve the privacy guarantees made under differential privacy by preventing dilution, as described previously herein. As discussed previously, conventional differential privacy implementations allot a privacy budget. This budget can take the form of either adding increasing amounts of noise to similar queries or rejecting similar queries outright. The process 500 shown has two primary advantages over conventional approaches. First, process 500 determines if two queries are similar by assessing if the partitions are statistically consistent. This means that two queries, which return identical results, but have different functional forms would be detected. An example of this type of query pair is as follows:

---
SELECT AVG(x) FROM table, and
SELECT SUM(x)/COUNT(*) FROM table.
---

These two queries would return the same nominal result, but using simple text inspection would determine that they are functionally different. Second, process 500 caches the differentially private query result in a hash table, for rapid lookup. This means that rather than outright rejecting a query, process 500 would simply return results that are identical to a past result. The end user still will have a meaningful result rather than being rejected outright.

More specifically, at 505 a system (e.g., computing system 115 executing differential privacy query module 251) can obtain the query, as previously described herein (e.g., FIG. 3, 305). At 509, the system determines relevance criteria for the query obtained at 505. For example, using either heuristics or a predefined time window, a freshness window can be established for determining whether the query obtained at 505 is relevant to a previous query. At 513, the system determines whether the query obtained at 505 is relevant using the relevance criteria determined at 509, as previously described herein (e.g., FIG. 3, 337). If no previous query is relevant to the query received at 505 (e.g., 513, "NO"), then the system can refresh the cached query results by executing the query, as previously described herein (e.g., FIG. 4, process 400). Using the query executed at 517, the system may replace the currently stale query result and return the refreshed cache result 119 at 521. If the previous (e.g., cached) query is determined to be relevant at 513 (i.e., 513, "YES"), then the newly obtained query from 505 may not be executed anew and the cached result 119, 339 may be returned at 521.

Figure 6:
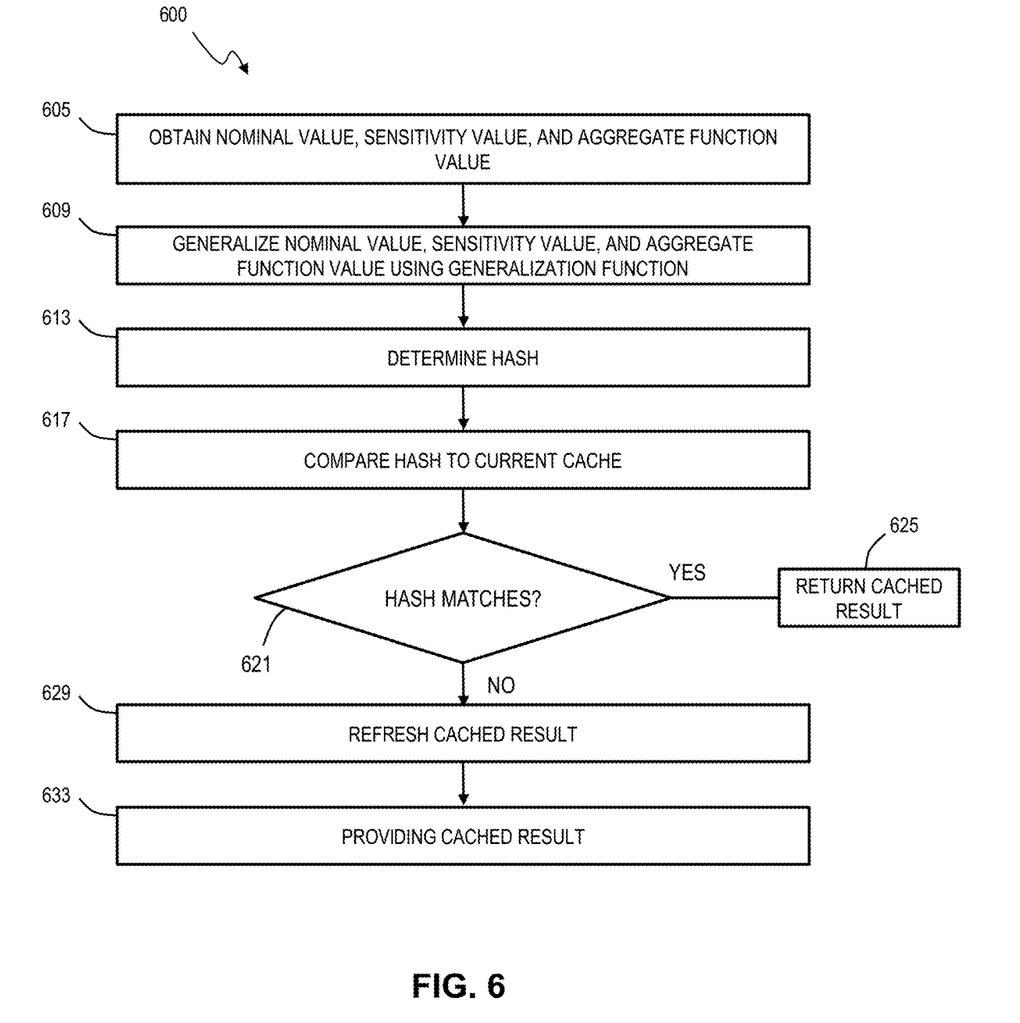
FIG. 6 shows a flow block diagram illustrating an example process for determining a differential privacy query result, in accordance with aspects of the present disclosure.

FIG. 6 shows a flow block diagram illustrating an example of a process 600 for determining a differential privacy query result, in accordance with aspects of the present disclosure. In accordance with aspects of the present disclosure, the process 600 compares the statistical similarity of partitioned results, which overcomes the technical challenge of identifying similar queries, as previously described herein. More specifically, implementations consistent with the present disclosure return a cached result if two queries result in statistically similar results when processed by partitions of a virtualized database (e.g., virtualize database 123). While a conventional assessment of equivalence could use a statistical method, such as a Kolmogorov-Smirnov test (KS-test), some implementations consistent with the present disclosure assess equivalence by applying a special case of a generalization function. A generalization function (F) maps some continuous value (x) into discrete space: F(x)=xi, where xi is a discrete value. In this way, there can exist some non-zero value (dx) for which F(x+dx)=F(x)=xi. The process shown in FIG. 6 defines dx to be small enough to pass a test, such as a KS-test at some confidence level. As an illustrative example consider the KS-test. The central metric of the KS-test is the maximum difference in:

$$D(S1,S2)=\max(|CDF(x|S1)-DF(x|S2)|) \quad (6)$$

In expression (6) above, S1 and S2 are query results over two partitions of the virtualized database, CDF is a cumulative distribution function (CDF) over the set of partitions, and D is the maximum difference between the two CDFs. A KS-test can consider two samples to be equivalent if D is less than some set predefined threshold. The process 600 defines a generalization function F(median, sensitivity)=F(median+dm, sensitivity+ds)=(mi, si), where, 0<dm, ds<τ, and mi and si are discrete estimates of median and sensitivity.

Figure 7:
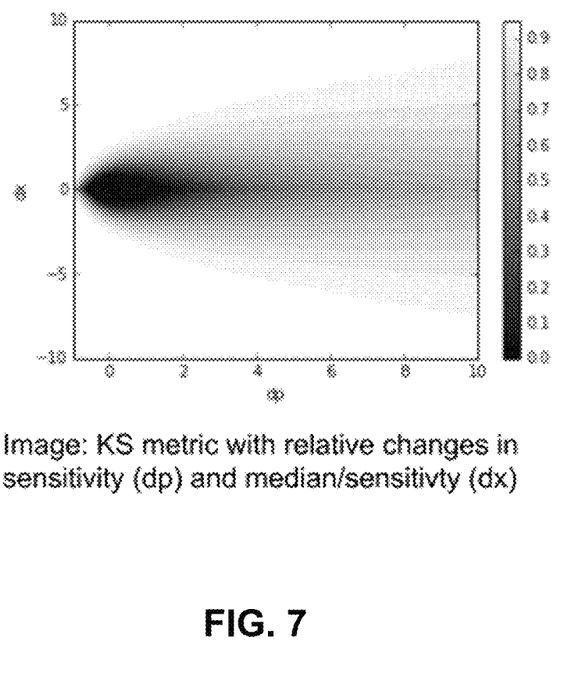
FIG. 7 shows a graph illustrating an example of Kolmogorov-Smirnov Test (KS-Test) for determining equivalence of two query results, in accordance with aspects of the present disclosure.

Referring for a moment to the next drawing, FIG. 7 illustrates an impact on the KS-metric for varying values of sensitivity along the x-axis and median/sensitivity shown along the y-axis. Dark areas correspond to small values of D (in other words statistical equivalence), and light areas show large values of D. As shown here large increases in the KS metric are driven by relative difference in the ratio: median/sensitivity.

With this the generalization function for the KS-test would take the form:

$$F(x, s | s', K_x, K_s) = \left( \left\lfloor \frac{x}{K_x s'} \right\rfloor, \left\lfloor \frac{s}{K_s} \right\rfloor \right) \quad (7)$$

In expression (7) above, s', Kx, and Ks are positive constants chosen such that two equivalent samples' nominal value and sensitivity would be equivalent under a equivalence test such as KS. Once these terms are generalized an irreversible hash key or hash value can be generated from the aggregate function and the generalized values of x and s. This way when a new, equivalent query is executed it can generate the same hash key or value, and the cached result can be returned based on the hash key. This protects the partition values, and by extension, secures the sensitive measurement.

Referring back to the process 600 in FIG. 6, at 605 a system (e.g., computing system 115 executing differential privacy query module 251) obtains a nominal value (e.g., FIG. 3B, 353), a sensitivity value (e.g., FIG. 3B, 353), and an aggregate function value. At 609, the system can execute a generalization function that generalizes the values obtained at 605 onto a discrete grid. At 613, the generalized function of 609, operating on the values obtained at 605, determines an irreversible hash key using a hash function, as is known in the art. For example, the generalization function can combine estimates of the generalized function with the aggregate function obtained at 605 to determine an irreversible hash key 460. At 617, the system compares the hash key or value determined at 613 with a current cache. At 621, based on the comparison of 617, the system determines whether the hash key determined at 613 matches or substantially matches the cache of 617 (e.g., matches the hash value of a query result that was previously stored in the result cache 221). If the hash is determined to match at 621 (i.e., 621 is "YES"), then at 625, the corresponding cached result can be provided in response to the query, as previously described herein (e.g., FIG. 3B, 339; FIG. 4, 437). If the hash does not match at 621 (i.e., 621 is "NO"), then at 629, the new query result (e.g., along with its hash value from 621) can be stored in the result cache (e.g., in a hash table in the result cache 221) and, at 633 the result 119 is returned to the user.

Various embodiments consistent with the disclosures may be implemented on one or more computing devices, such as a server, a desktop computer, a laptop computer, or the like, using program code stored on memory media and executed by one or more processors of the computing device, as is known in the pertinent art.

The foregoing description of the disclosure, along with its associated examples of embodiments, has been presented for purposes of illustration only. The description is not exhaustive and does not limit the disclosure to the precise forms disclosed. Those skilled in the art will appreciate from the foregoing description that modifications and variations are possible in light of the above teachings or may be acquired from practicing the disclosure.

Likewise, the operations, functions, and/or steps described with respect to the examples of processes and methods need not be performed in the same sequence discussed or with the same degree of separation. Various operations, functions, and/or steps may be omitted, repeated, combined, modified, or divided, as necessary to achieve the same or similar objectives or enhancements.

What is claimed is:

1. A system for enhancing the determination of differential privacy query results, the system comprising:
   a database;
   a result cache;
   one or more processors; and
   a computer-readable data storage device storing program instructions that, when executed by the one or more processors, cause the system to perform operations comprising:
   obtaining a first query of the database;
   determining that a specificity of the first query exceeds a specificity threshold;
   determining that the result cache lacks any query results of previous queries that are substantially equivalent to the first query;
   partitioning the database into a plurality of groups;
   determining a query result by executing the first query on the plurality of groups;
   determining a sensitivity of the query and a nominal measurement of the query;
   determining a noisy result by adding noise to the query result based on the sensitivity of the query and the nominal measurement of the query;
   storing the noisy result in the result cache with a hash value generated using the first query, the sensitivity of the query, and the nominal measurement of the query;
   providing the noisy result in response to the first query;
   determining in response to a subsequent query that the result cache includes query results substantially equivalent to the subsequent query based at least on the hash value; and
   providing the noisy result from the result cache in response to the subsequent query.

2. The system of claim 1 further comprising determining whether a query is executed over a dataset with sufficient size to be divided into statistically equivalent groups.

3. The system of claim 2, wherein determining if a query can be divided into statistically equivalent groups is measured using a statistical test of equivalence such as counting, ANOVA, or other tests for equivalence.

4. The system of claim 1, wherein determining that the result cache lacks any query results of previous queries that are substantially equivalent to the first query comprises determining whether one or more of the query results of previous queries are stale.

5. The system of claim 4, wherein determining whether one or more of the query results of previous queries are stale comprises determining that a predetermined period has passed since determination of the one or more query results of the previous queries.

6. The system of claim 1, wherein adding noise to the query result comprises generating a randomized result using a Sample and Aggregate (SA) framework.

7. The system of claim 1, wherein the database comprises a virtualized database comprising a single data structure configured to present a plurality of data sources as a single data source.

8. The system of claim 1, wherein the virtualized database comprises personal information of individuals.

9. A system for enhancing the determination of differential privacy query results, the system comprising:
   a database;
   a result cache;
   one or more processors; and
   a computer-readable data storage device storing program instructions that, when executed by the one or more processors, cause the system to perform operations comprising:
   obtaining a first query of the database;
   determining that a specificity of the first query exceeds a specificity threshold;
   determining that the result cache lacks any query results of previous queries that are substantially equivalent to the first query;
   partitioning the database into a plurality of groups;
   determining a query result by executing the first query on the plurality of groups;
   determining a sensitivity of the query and a nominal measurement of the query;
   determining a noisy result by adding noise to the query result based on the sensitivity of the query and the nominal measurement of the query;
   storing the noisy result in the result cache with a hash value generated using the first query, the sensitivity of the query, and the nominal measurement of the query;
   providing the noisy result in response to the first query; and
   maintaining the noisy result in the result cache for a predetermined period of time for providing in response to one or more subsequently obtained queries of the database based on the hash value and a second hash value of the one or more subsequently obtained queries.

10. The system according to claim 9, comprising automatically scaling the added noise to obscure new observations qualified as outliers within the database.

11. The system according to claim 9, wherein the added noise is proportional to a maximum sensitivity introduced by an entire dataset in the database.

12. The system according to claim 9, wherein the determining the noisy result comprises:
    drawing a sample from a stochastic distribution, the one or more samples centered at the nominal measurement of the query; and
    adding noise to the sample.

13. The system of claim 9 further comprising determining whether a query is executed over a dataset with sufficient size to be divided into statistically equivalent groups.

14. The system of claim 13, wherein determining if a query can be divided into statistically equivalent groups is measured using a statistical test of equivalence such as counting, ANOVA, or other tests for equivalence.

15. The system of claim 9, wherein determining that the result cache lacks any query results of previous queries that are substantially equivalent to the first query comprises determining whether one or more of the query results of previous queries are stale.

16. The system of claim 15, wherein determining whether one or more of the query results of previous queries are stale comprises determining that a predetermined period has passed since determination of the one or more query results of the previous queries.

17. The system of claim 9, wherein the database comprises a virtualized database comprising a single data structure configured to present a plurality of data sources as a single data source.

18. The system of claim 9, wherein the virtualized database comprises personal information of individuals.

* * * * *